United States Patent [19]

Miller

[11] Patent Number: 4,974,760

[45] Date of Patent: Dec. 4, 1990

[54] ARTICLE CARRIER FOR A WALKER

[76] Inventor: Patricia H. Miller, 222 Louvaine Dr., Kenmore, N.Y. 14223

[21] Appl. No.: 454,317

[22] Filed: Dec. 21, 1989

[51] Int. Cl.[5] ........................ B60R 11/00; A61H 3/00

[52] U.S. Cl. ................................ 224/42.46 R; 135/67

[58] Field of Search .................... 224/42.46 R; 135/67

[56] References Cited

U.S. PATENT DOCUMENTS

| | | | |
|---|---|---|---|
| 599,120 | 2/1898 | Coolidge | 224/30 A |
| 1,577,298 | 3/1926 | Roeller | 224/42.46 R |
| 2,507,842 | 5/1950 | Waddill | 224/42.46 |
| 3,903,944 | 9/1975 | Montgomery et al. | 224/32 R |
| 3,957,071 | 5/1976 | Kenner | 135/67 |
| 4,184,618 | 1/1980 | Jones | 224/42.46 R |
| 4,240,480 | 12/1980 | Strobel | 383/15 |
| 4,339,061 | 7/1982 | Dunn | 224/42.46 R |
| 4,449,750 | 5/1984 | Pultman | 297/188 |
| 4,491,257 | 1/1985 | Ingles | 224/42.45 R |
| 4,577,903 | 3/1986 | Wells | 297/188 |
| 4,676,416 | 6/1987 | Harmon | 224/42.46 R |
| 4,800,911 | 1/1989 | Endres et al. | 135/67 |
| 4,830,238 | 5/1989 | Widinski et al. | 224/42.46 R |

FOREIGN PATENT DOCUMENTS

| | | | |
|---|---|---|---|
| 56500 | 4/1936 | Norway | 224/42.46 R |

*Primary Examiner*—Henry J. Recla
*Assistant Examiner*—Keith Kupferschmid
*Attorney, Agent, or Firm*—Hodgson Russ Andrews Woods & Goodyear

[57] ABSTRACT

An article carrier attachable to a front brace of a walker and composed of a flexible material whereby the article carrier is foldable with the walker as the walker is collapsed for storage or transport. The article carrier has front and rear panels which extend generally over the width of the walker and has side panels the width of each of which is less than about 5 inches to reduce instability effects of the carrier which might otherwise result if the carrier were positioned too far outside of the space between the walker legs while at the same time reducing the space taken up by the carrier between the walker legs so that more comfortable use of the walker may be afforded the user. Tabs are provided on the side panels to attach to the respective front legs of the walker to prevent "bunching" of the article carrier toward the center. Thus, increased mobility may be provided to the user for a more independent and higher quality life.

20 Claims, 1 Drawing Sheet

ARTICLE CARRIER FOR A WALKER

The present invention relates to article carriers. More particularly, the present invention relates to article carriers or bags which are attachable to walkers.

It is desirable to increase the independence of a disabled or handicapped individual who must use a walker. One way of doing this is to alleviate his or her need for depending on someone to transport small items from room to room when all of his or her energies must be concentrated on movement of himself or herself and the walker. With weight at a premium, it is also desirable that an undue amount of weight not be added to the weight of the walker. Article carriers or bags have been proposed for use with walkers to relieve such burdens. Article carriers for various purposes are disclosed in U.S. Pat. Nos. 4,676,416 to Harmon, 4,577,903 to Wells, 4,491,257 to Ingles, 4,449,750 to Pultman, 2,507,842 to Waddill, 1,577,298 to Roeller, and 4,800,911 to Endres et al.

Special problems are prevalent in providing article carriers for walkers. For example, as discussed in Endres et al, carriers secured on the front of a walker, away from the user and outside of a space between the walker legs, may disadvantageously cause a substantial imbalance of the walker, perhaps to the point where if there is significant weight in the articles placed in a carrier, the user may have trouble manipulating the walker. Moreover, the walker may become difficult to move between steps, and the weight imbalance may cause serious discomfort or even injury to the user's back, shoulder, and arm muscles. Endres et al proposes to place a carrier substantially entirely within the space between opposite leg members in a walker in order to solve this weight distribution problem. However, the proposed solution of Endres et al may result in other problems to the user. Thus, the proposed article carrier of Endres et al, having a width between about 16 inches and about 18 inches and a length between about 5 inches and about 8 inches, may take up perhaps half or more of the available space, in a horizontal plane, within the walker and thereby get in the way of effective use of the walker by the user, as evident in the drawings thereof. Thus, such a walker carrier may contribute to the difficulties a handicapped individual may already have in moving the walker. Another problem is disposition of the carrier when the walker is folded such as for storage or placing it in the trunk of a car for transport. A carrier composed of rigid frame members, as depicted at FIGS. 3 through 5 of Endres et al, may not allow the folding of the carrier with the walker whereby the carrier must first be removed whenever it is necessary to fold the walker and then reattached when it is again desired to use the walker. More flexible bags may, however, be attached in such a way that they may have a tendency to "bunch" toward the middle, i.e., the sides may collapse toward each other, thereby making the bag unwieldy and cumbersome to the user so that it is difficult to place articles in and remove them from the bag.

An article carrier which has minimal weight, takes up little of the space within the walker yet does not contribute appreciably to instability of the walker, and which is flexible so that it may be folded with the walker may aid in providing independence to the user so that he or she may be able to eat out and visit the doctor and friends more often without the difficulties previously associated with the carrying of his or her personal effects while already undergoing the difficult task of manipulating the walker. Thus, such an article carrier may enable the user to enjoy a happier life.

It is therefore an object of the present invention to provide a lightweight article carrier for a walker wherein stability as well as ease of use of the walker is maintained and wherein the carrier may be conveniently folded with the walker whereby the user's independence may be increased for a happier life.

It is another object of the present invention to provide such an article carrier which does not "bunch" toward the middle whereby the placing of articles in and removal of articles from the carrier may be less difficult.

In order to achieve the above and other objects of the present invention, in accordance with the present invention there is provided an article carrier composed of a flexible material such as cloth and having front, rear, and side panels, the side panels each having a width which is less than about 5 inches, the article carrier being attachable to a structural member such as a front bar of a walker and extending between the sides of the walker and having tabs or other suitable means attached to each of the side panels for attaching thereof to the sides of the walker to prevent "bunching" movement of the side panels toward each other. Other objects, features, and advantages of the present invention will become apparent in the following detailed description of the preferred embodiment thereof which should be read in connection with the accompanying drawings.

DETAILED DESCRIPTION OF THE PREFERRED EMBODIMENTS

Figure 1:
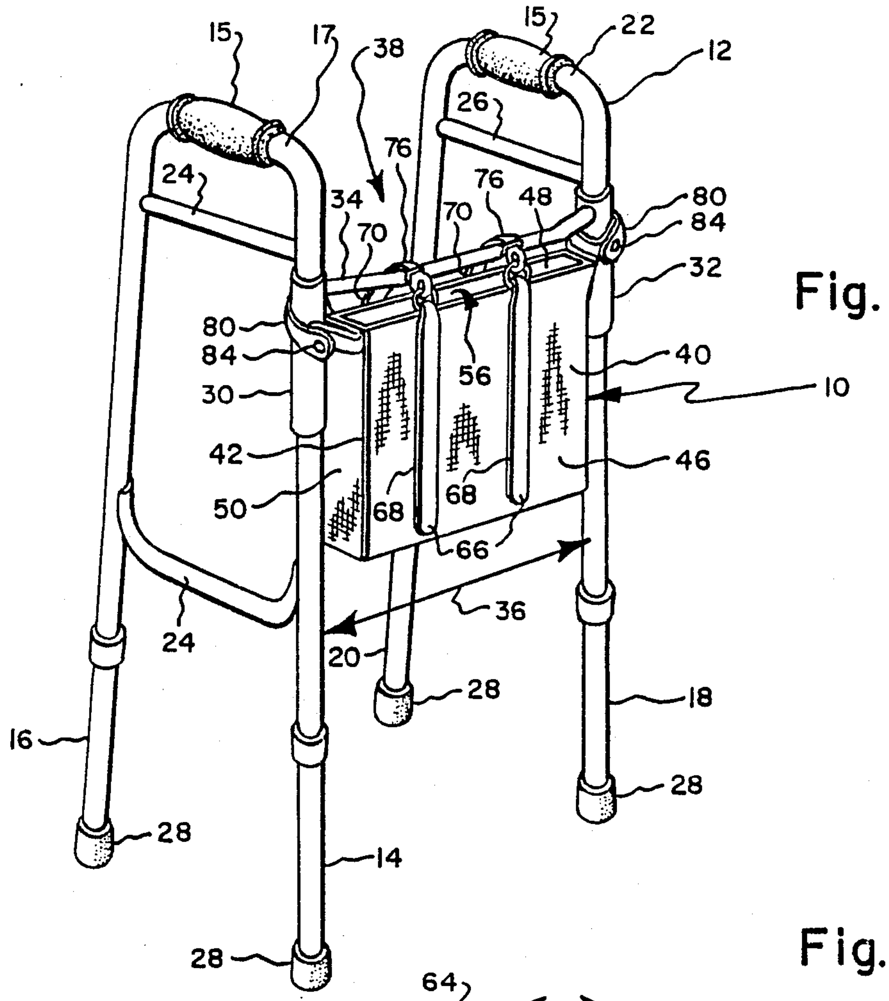
FIG. 1 is a perspective view of an article carrier embodying the present invention attached to a walker.

Referring to FIG. 1, there is shown generally at 10 an article carrier or bag which is removably attached to a foldable walker 12.

The walker 12 includes a first pair of generally vertical leg members comprising a forward leg member 14 and an aft leg member 16. The upper ends of the leg members 14 and 16 are joined by a generally horizontal connecting portion 17 which may be a separate member connected thereto or, as shown, integral with the upper portions of the legs. The connecting member 17 may include a suitable hand grip 15 intermediate thereof. As used herein, the terms "vertical" and "horizontal" are meant to be relative to the upright position of the walker and carrier, as shown in FIG. 1, for ordinary use. The walker 12 also includes a second pair of leg members comprising a forward leg member 18 and an aft leg member 20 which are similar to leg members 14 and 16 and the upper ends of which are suitably connected by a connecting member 22 which is similar to connecting member 17 and which may also include a suitable hand grip 15. A pair of members 24 may be suitably connected between and intermediate the ends of the first pair of leg members 14 and 16 for structurally stabilizing, i.e., bracing, thereof. Similar bracing members 26 (only one shown) may be suitably attached between and intermediate the ends of the second pair of leg members 18 and 20. Each of the leg members may be provided with suitable rubber feet 28 for contacting the floor.

A sleeve 30 circumferentially surroundingly engages the upper portion of forward leg member 14 and is circumferentially slidable thereabout. A similar sleeve 32 similarly engages forward leg 18. A brace member 34 extends between and is suitably and rigidly attached to the upper portions of the sleeves 30 and 32. Suitable means (not shown), which are conventionally known in the art, are provided to lock the positions of the forward leg members 14 and 18 circumferentially relative to the respective sleeves 30 and 32 to the open position of the walker 12 for use as shown in FIG. 1, the locking means being releasable to allow circumferentially slidable movement of the forward legs 14 and 18 within the respective sleeves 30 and 32 for collapsing or folding the walker for storage or transportation thereof such as in the trunk of an automobile or the like. The walker 12 which has been described may be of any suitable shape and size, and such walkers are conventionally known to those of ordinary skill in the art to which this invention pertains. For example, to accommodate most adults, each of the legs 14, 16, 18, and 20 may have a height of perhaps 30 to 38 inches, the distance between each forward leg member and the respective aft leg member at the upper portions thereof may be perhaps 11 inches, and the length of brace member 34 may be perhaps 16 inches whereby the first pair of leg members 14 and 16 is spaced from the second pair of leg members 18 and 20, when the walker 12 is open and ready for use, a distance, illustrated at 36, which is equal to perhaps 16 inches (equal substantially to the length of brace 34). Thus, a space, illustrated at 38, of perhaps 11 inches by 16 inches in a horizontal plane is provided between the pairs of leg members and rearwardly of the brace member 34 in which space 38 user may position his or her body while standing. It is to be understood that the composition and sizing of the walker 12 may be different from that shown in FIG. 1 and still come within the scope of the present invention as defined in the claims.

Figure 2:
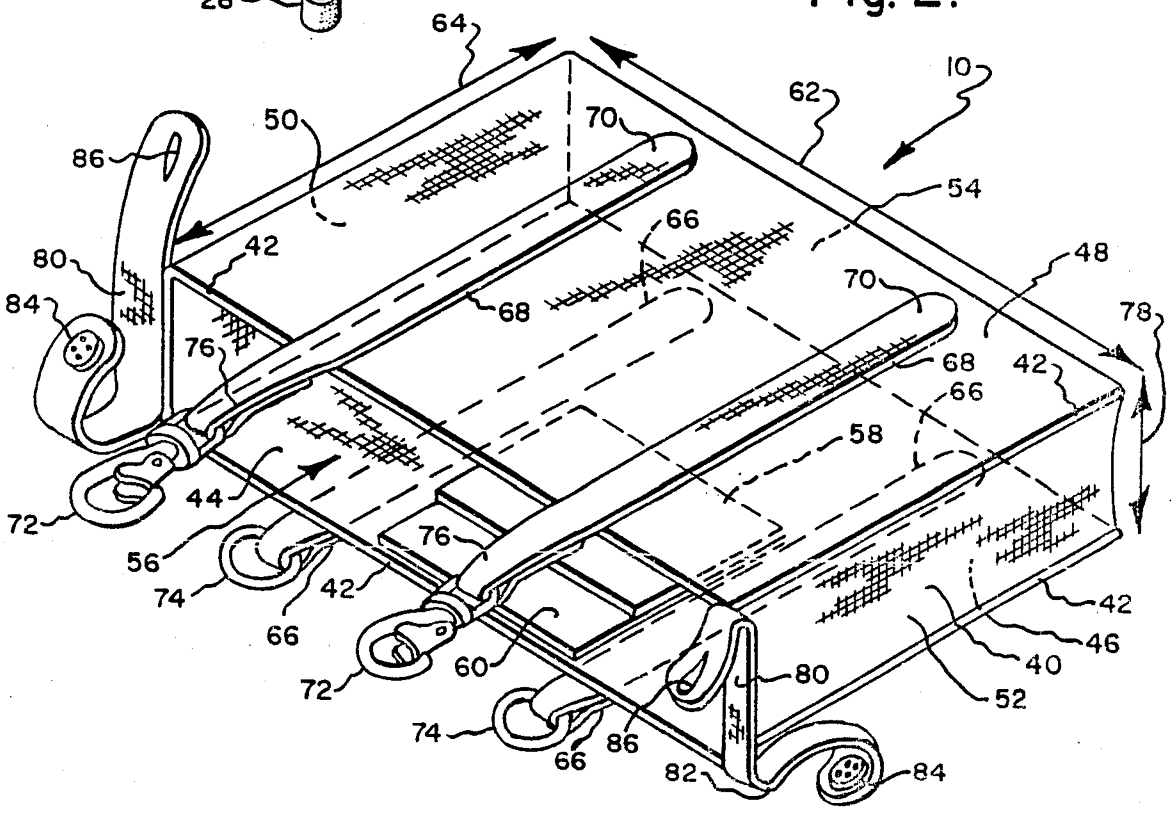
FIG. 2 is a perspective view of the article carrier of FIG. 1.

Referring to FIGS. 1 and 2, the article carrier 10 is composed of a suitable flexible material 40, preferably washable, which allows it to remain attached to the walker as the walker is folded for transport or storage. By "flexible", for the purposes of this specification and the claims, is meant, in reference to the material 40, that the material has no rigid reinforcements or members which would prevent folding of the carrier 10 as the walker 12 is folded. For example, the article carrier 10 may be composed of a double crocheted cotton or woolen yarn, a quilted material or other suitable material whereby it may be light enough to not be unduly burdensome to the user yet sufficiently heavy so as not to be blown about unduly by the wind. A single chain trim 42, which may perhaps have a pleasingly contrasting color, may also be provided. Alternatively, the trim 42 may be a double layer of the same cloth as the rest of the carrier so that it may pleasingly be more plain. The interior of bag 10 may be lined with a suitable material 44 such as a good serviceable linen or polyester.

The bag 10 is comprised of a front panel 46, a rear panel 48, and a pair of side panels 50 and 52 interweavingly or otherwise integrally connected to panels 46 and 48 and corresponding respectively to the first and second pairs of legs. As used in this specifications and the claims, the term "side panel" is meant to also include the area of connection between side edges of the front and rear panels where the front and rear panels are directly connected to each other. A bottom panel 54 is interweavingly or otherwise integrally connected to the bottom edges of the front, rear, and side panels 46, 48, 50, and 52 respectively to form the bottom of the bag 10. An opening, illustrated at 56, is provided to the bag between the upper edges of the panels to allow the user to place articles in the bag and remove articles therefrom. If desired, the opening 56 may be closable by suitable means such as a zipper.

Attached to the inside surface of the front panel 46, in the upper or other suitable portion thereof, is a suitable pocket 58 composed of a suitable material such as a good serviceable linen or polyester which may include a flap 60 overlying its upper open end. Suitable means (not shown) such as a button and buttonhole or a zipper may be provided for closing the upper end so that small items such as loose change may be securely kept in the bag without concern that they may be lost during manipulation of the walker and particularly during times when the walker is folded during storage or transport in the trunk of a car. The pocket 58 may be interchangeable with pockets of other sizes to accommodate individual tastes.

In order to maintain stability as well as to provide increased volume for carrying articles, the length, illustrated at 62, of each of the front and rear panels 46 and 48 respectively is equal substantially to the distance 36 between the first and second pairs of leg members whereby the bag 10 may extend substantially entirely across the width of the walker 12. For example, if distance 36 is equal to 16 inches, then the length 62 of each of the front and rear panels 46 and 48 respectively may be equal to or slightly less than 16 inches. The bag 10 may have any suitable depth, illustrated at 64, such as, for example, 12 inches.

A pair of reinforcing members 66, suitably spaced over the length 62 of the front panel 46, extend over substantially the height 64 of the bag 10 and above the front panel 46 a distance of perhaps $1\frac{1}{2}$ inches, the width of each of the reinforcing members 66 being perhaps $1\frac{1}{4}$ inches. For example, members 66 may be spaced apart a distance of perhaps about 7 inches so that a person may easily reach into the carrier. The reinforcing members 66 may be composed of any suitable material such as that of material 40 which may be interwoven with the material 40 of the front panel 46 and which may be trimmed with single chain trim 68 similar to trim 42. A pair of reinforcing members 70, similar to reinforcing members 66 and similarly spaced, are provided on the rear panel 48 and have upper end portions 76 which extend above the rear panel 48 a distance of perhaps 4 inches. Reinforcing members 70 may also be provided with single chain trim 68.

The upper ends of reinforcing members 66 and 70 terminate in suitable means such as, for example, conventionally known hook or buckle members 72 on reinforcing members 70 to be received by suitable eye members 74 on the respectively associated reinforcing members 66 for attachment thereto after the upper end portions 76 are draped over the horizontal brace 34 with the bag 10 disposed below the brace 34 and between the front leg members 14 and 18 for attachment of the bag 10 to the walker 12. However, it should be noted that other suitable means may be provided for attaching the bag 10 to the walker 12, and such other means are meant to come within the scope of the present invention as defined in the claims. For example, the reinforcing members 66 and 70 may be tied together.

In order to reduce instability which might otherwise occur from the bag 10 being disposed outside of the opening 38 while at the same time allowing an increased amount of space within opening 38 so that the walker 12 may be more easily handled by the user, in accordance with the present invention the bag 10 is constructed so that each of the side panels 50 and 52 has a width, illustrated at 78, which is less than about 5 inches. For example, width 78 may be about 3½ inches. For another example, width 78 may be considered to be slightly more than 0 inch if the side edges of the front and rear panels are directly connected. Directly connecting the front and rear panels is preferred for the benefit of the carrier's appearance as well as reducing the space taken up by the carrier inside the walker.

In order to prevent "bunching" of the bag 10 toward the middle, in accordance with the present invention a strap or tab 80, having a length of perhaps 9½ inches and a width of perhaps 1¼ inches and also composed of similar material to that of material 40 and perhaps having a single chain trim 82 similar to trim 42, is suitably attached to the upper edge or portion of each side panel 50 and 52 such as by interweaving therewith for attachment to the respectively associated front leg member 14 and 18. An intermediate portion of each strap 80 is attached to the respectively associated side panel 50 and 52, and the end portions are provided respectively with a button 84 and buttonhole 86 whereby the strap 80 may be caused to surroundingly engage the respectively associated front leg member 14 or 18 and the end portions thereof connected by means of the button 84 and buttonhole 86 to suitably secure the upper edges of the respective side panels 50 and 52 to the respectively associated front legs 14 and 18 whereby inwardly directed "bunching" movement of the side panels 50 and 52 may be prevented. It is to be understood that other suitable means for securing the upper ends of the side panels 50 and 52 to the respectively associated front legs 14 and 18 may be provided, and such means are meant to come within the scope of the present invention as defined by the claims. For example, the end portions of the straps 80 may be tied together.

Thus, there is provided in accordance with the present invention an article carrier which may be positioned to not appreciably affect the stability of the walker yet be out of the way of the user of the walker, may have a maximum volume for placement of articles yet be prevented from "bunching" toward the center, may be of lightweight so as to reduce any increased weight burden on the user yet be heavy enough to not be blown about by the wind, and may be left on the walker and folded up with the walker so that it need not be removed every time the walker is folded up for transport or storage and replaced when unfolded for use. Thus, an article carrier according to the present invention allows a more independent life for the user whereby the user may be enabled to eat out and visit with the doctor and friends more often, and the quality of the life of the user may be improved.

It should be understood that while the invention has been described in detail herein, the invention can be embodied otherwise without departing from the principles thereof and such other embodiments are meant to come within the scope of the present invention as defined by the appended claims.

What is claimed is:

1. An article carrier for use with a walker which walker includes a first pair of legs having upper end portions and a first hand grip means connecting the upper end portions, a second pair of legs having upper end portions and a second hand grip means connecting the upper end portions of the second pair of legs, the first pair of legs spaced a predetermined distance from the second pair of legs, and a structural member connecting the upper end portion of one of the first pair of legs with the upper end portion of one of the second pair of legs to define a space within the walker bounded by the first and second pairs of legs, the article carrier comprising a flexible structure having a front and a rear panel the length of each of which panels is equal substantially to said predetermined distance, a pair of side panels connected to said front and rear panels, said front and rear panels and said side panels having bottom edges which are connected to define a closed bottom to the article carrier, said front and rear panels and said side panels having upper edges which define therebetween means for introduction of articles thereinto, means for fastening the article carrier to the structural member which fastening means comprises at least one reinforcing strap attached to each of said front and rear panels and extending beyond the respective upper edges of said front and rear panels to terminate in respective end portions and further comprising means for connecting said respective strap end portions so that the article carrier may hang from the structural member in vertical alignment therewith, means attached to each of said side panels for securing said respective side panel to said respective pair of legs to prevent bunching of the article carrier, and each of said side panels having a width which is equal to less than about 5 inches.

2. An article carrier according to claim 1 wherein the article carrier is composed of a double crocheted yarn material.

3. An article carrier according to claim 2 further comprising an inner lining covering said front, rear, and side panels and a pocket attached to said inner lining.

4. An article carrier according to claim 2 wherein said means for fastening said article carrier to the structural member comprises at least two of said reinforcing straps attached to each of said front and rear panels and extending over substantially the height thereof and beyond said respective upper edges thereof to terminate in said respective end portions, a pair of hook means on said respective strap end portions for one of said front and rear panels and a pair of eye means for receiving said respective hook means on said respective strap end portions for the other of said front and rear panels.

5. An article carrier according to claim 4 wherein said securing means comprises a tab member having a middle portion which is attached to said upper edge of said respective side panel, a pair of end portions, and means for connecting said tab member end portions.

6. An article carrier according to claim 5 further comprising a button on one of said tab member end portions and means defining a buttonhole on the other of said tab member end portions for receiving said button.

7. An article carrier according to claim 6 wherein said length of each of said front and rear panels is equal to about 16 inches, and each of said side and front and rear panels having a height which is equal to about 12 inches.

8. An article carrier according to claim 1 wherein said securing means comprises a tab member having a middle portion which is attached to said upper edge of said respective side panel, a pair of end portions, and means for connecting said tab member end portions.

9. An article carrier for use with a foldable walker which walker includes a first pair of legs having upper end portions and a first hand grip means connecting the upper end portions, a second pair of legs having upper end portions and a second hand grip means connecting the upper end portions of the second pair of legs, the first pair of legs spaced a predetermined distance from the second pair of legs, and a structural member connecting the upper end portion of one of the first pair of legs with the upper end portion of one of the second pair of legs to define a space within the walker bounded by the first and second pairs of legs, the article carrier comprising a flexible structure having a front and a rear panel the length of each of which panels is equal substantially to said predetermined distance, a pair of side panels connected to said front and rear panels, said front and rear panels and said side panels having bottom edges which are connected to define a closed bottom to the article carrier, said front and rear panels and said side panels having upper edges which define therebetween means for introduction of articles thereinto, at least one reinforcing strap attached to each of said front and rear panels and extending beyond said respective upper edges thereof to terminate in respective end portions, means for connecting said strap end portions for fastening the article carrier to the structural member with the article carrier disposed to hang from the structural member in vertical alignment therewith, means attached to each of said side panel upper edges for securing said respective side panel upper edges to said first and second pairs of legs respectively to prevent bunching of the article carrier, said securing means comprising a tab member having a middle portion which is attached to said upper edge of said respective side panel, a pair of end portions, and means for connecting said tab member end portions, and each of said side panels having a width which is equal to less than about 5 inches.

10. An article carrier according to claim 9 wherein said reinforcing strap extends over substantially the height of said respective one of said front and rear panels, and said means for connecting said strap end portions comprises hook means attached to said strap end portion for one of said front and rear panels and further comprises eye means attached to said strap end portion for the other of said front and rear panels for receiving said hook means.

11. In combination with a walker comprising a first pair of legs having upper end portions and a first hand grip means connected between said upper end portions, a second pair of legs having upper end portions and a second hand grip means connected between said upper end portions of said second pair of legs, said first pair of legs spaced a predetermined distance from said second pair of legs, and a structural member connecting said upper end portion of one of said first pair of legs with said upper end portion of one of said second pair of legs to define a space within the walker bounded by said first and second pairs of legs, the article carrier comprising a flexible structure having a front and a rear panel the length of each of which is equal substantially to said predetermined distance, a pair of side panels connected to said front and rear panels, said front and rear panels and said side panels having bottom edges which are connected to define a closed bottom to the article carrier, said front, rear, and side panels having upper edges which define therebetween means for introduction of articles thereinto, means for fastening the article carrier to the structural member which fastening means comprises at least one reinforcing strap attached to each of said front and rear panels and extending beyond the respective upper edges of said front and rear panels to terminate in respective end portions and further comprising means for connecting said respective strap end portions so that the article carrier may hang from the structural member in vertical alignment therewith, means attached to each of said side panels for securing said side panels to said first and second pairs of legs respectively to prevent bunching of the article carrier, and each of said side panels having a width which is equal to less than about 5 inches.

12. A combination according to claim 10 wherein said article carrier is composed of a double crocheted yarn material.

13. A combination according to claim 11 further comprising an inner lining covering said front, rear, and side panels and a pocket attached to said inner lining.

14. A combination according to claim 10 wherein said means for connecting said respective strap end portions comprises hook means on said end portion of said strap for one of said front and rear panels and eye means on said end portion of said strap for the other of said front and rear panels for receiving said respective hook means.

15. A combination according to claim 13 wherein said securing means comprises a tab means having a middle portion which is attached to said upper edge of said respective side panel, a pair of end portions, and means for connecting said tab means end portions.

16. A combination according to claim 14 further comprising a button on one of said tab means end portions and means defining a buttonhole on the other of said tab means end portions for receiving said button.

17. A combination according to claim 15 wherein said length of each of said front and rear panels is equal to about 16 inches, and each of said side and front and rear panels having a height which is equal to about 12 inches.

18. A combination according to claim 10 wherein said means for fastening said article carrier to the structural member comprises at least two of said reinforcing straps attached to each of said front and rear panels and extending over substantially the height thereof and beyond said respective upper edges to terminate at said respective end portions, a pair of hook means on said end portions respectively of said straps for one of said front and rear panels, and a pair of eye means on said end portions respectively of said straps for the other of said front and rear panels for receiving said respective hook means.

19. A combination according to claim 10 wherein said securing means comprises tab means having a middle portion which is attached to said upper edge of said respective side panel, a pair of end portions, and means for connecting said tab means end portions.

20. A combination according to claim 10 wherein the walker is foldable.

* * * * *